US007006907B2

(12) United States Patent
Usuki et al.

(10) Patent No.: US 7,006,907 B2
(45) Date of Patent: Feb. 28, 2006

(54) CONTROL APPARATUS AND METHOD FOR AUTOMATIC TRANSMISSION

(75) Inventors: Katsutoshi Usuki, Aichi (JP); Yuzo Yano, Aichi (JP); Toshinori Ishii, Aichi (JP); Masahiro Hamano, Aichi (JP); Yuichi Imamura, Tokyo (JP); Mitsuo Kunou, Aichi (JP)

(73) Assignee: JATCO LTD, Fuji (JP)

( * ) Notice: Subject to any disclaimer, the term of this patent is extended or adjusted under 35 U.S.C. 154(b) by 0 days.

(21) Appl. No.: 11/086,417

(22) Filed: Mar. 23, 2005

(65) Prior Publication Data

US 2005/0222735 A1 Oct. 6, 2005

(30) Foreign Application Priority Data

Mar. 31, 2004 (JP) ............................ 2004-104075

(51) Int. Cl.
*F16H 61/26* (2006.01)

(52) U.S. Cl. ............................ 701/51; 701/55; 701/56; 477/156

(58) Field of Classification Search .................. 701/51, 701/54, 55, 56, 58, 60, 61; 475/116, 120, 475/121, 122; 477/156, 159, 161, 155, 158
See application file for complete search history.

(56) References Cited

U.S. PATENT DOCUMENTS

| | | | | |
|---|---|---|---|---|
| 5,361,207 | A * | 11/1994 | Hayafune | 701/57 |
| 6,243,637 | B1 * | 6/2001 | Minowa et al. | 701/51 |
| 6,334,082 | B1 * | 12/2001 | Jeon | 701/55 |
| 6,684,144 | B1 * | 1/2004 | Sekii et al. | 701/51 |
| 6,732,037 | B1 * | 5/2004 | Jeon | 701/51 |
| 6,736,757 | B1 * | 5/2004 | Kubo et al. | 477/144 |
| 6,889,130 | B1 * | 5/2005 | Saitou et al. | 701/51 |

FOREIGN PATENT DOCUMENTS

JP 2-292566 A 12/1990

* cited by examiner

*Primary Examiner*—Richard M. Camby
(74) *Attorney, Agent, or Firm*—Foley & Lardner LLP

(57) ABSTRACT

In control apparatus and method for an automatic transmission, an initial hydraulic reference value is calculated which provides a reference value of an initial hydraulic from a shift kind and a throttle opening angle or from the parameter value corresponding to the throttle opening angle and a correction quantity is calculated for the reference value of the initial hydraulic on the basis of squares of a revolution speed of a piston calculated and of the revolution speed of the piston detected, the initial hydraulic reference value being set to the initial hydraulic during the ordinary gear shift and the initial hydraulic reference value being corrected by a correction quantity to set the corrected initial hydraulic reference value to the initial hydraulic when the gear shift to a predetermined target gear shift stage is carried out at a drive point different from during the ordinary gear shift.

14 Claims, 10 Drawing Sheets

FIG.3

| SHIFT STAGE | FRICTIONAL CLUTCHING ELEMENT | | | | |
|---|---|---|---|---|---|
| | FIRST CLUTCH 15 | SECOND CLUTCH 17 | THIRD CLUTCH 19 | FIRST BRAKE 22 | SECOND BRAKE 23 |
| FIRST SPEED STAGE | ○ | | | ○ | |
| SECOND SPEED STAGE | ○ | | | | ○ |
| THIRD SPEED STAGE | ○ | ○ | | | |
| FOUR SPEED STAGE | | ○ | | | ○ |
| REVERSE RANGE | | | ○ | ○ | |

CONTROL APPARATUS AND METHOD FOR AUTOMATIC TRANSMISSION

BACKGROUND OF THE INVENTION

1. Field of the Invention

The present invention relates to a control apparatus for an automatic transmission suitably used in an automotive vehicle.

2. Description of the Related Art

In general, an automatic transmission for an automotive vehicle becomes popular in which a revolution of an engine is inputted via a torque converter, a gear shift mechanism having a plurality of couples of planetary gears performs a gear shift for the inputted revolution, and the gear shifted revolution is outputted to a drive shaft or a propeller shaft. The gear mechanism in such a kind of automatic transmission as described above executes a gear shift by transmitting a revolution of an input shaft to a specific gear or a carrier constituting the planetary gear according to a shift position and by transmitting the revolution of the specific gear or carrier appropriately to an output shaft. In addition, the gear shift mechanism, to constrain the revolution of the specific gear or carrier during the gear shift, frictional clutching (or engagement) elements such as a plurality of clutches and brakes are provided. A combination of clutching (coupling or engagement) or release of these frictional clutching elements switches a transmission route to perform a predetermined gear shift. Hydraulic multi-plate clutch mechanisms have widely been adopted as these frictional clutching elements. Each hydraulic multi-plate clutch mechanism is mainly constituted by a clutch having a plurality of frictional plates and a piston as an actuator to bring in a close contact with the clutch. This piston presses the frictional plates and moves in a closely contact direction by supplying a working oil to a working oil chamber formed between cylinders. When the working oil pressure supply to the working oil chamber is stopped, a restoring force of a return spring causes the frictional plates to be recovered to a non-operation position at which the piston does not press the frictional plates. In addition, during an operation of the piston, a, so-called, ineffective stroke is present until the piston is brought in contact with the clutch. However, in order to eliminate this ineffective stroke as quickly as possible, the working oil pressure (the hydraulic) under a high pressure is once supplied to the oil pressure chamber until the stroke of the piston is ended and, thereafter, the oil pressure (the hydraulic) under a relatively low pressure is supplied. It is noted that the oil pressure or supply time at this time is set to an appropriate oil pressure by a tuning for the engine output torque or its corresponding parameter so that an appropriate clutching (engagement) operation becomes possible.

However, it is a general practice that the piston and the cylinder to support slidably the piston are revolved together with the drive element to be engaged or a driven element. Hence, a pressure due to a centrifugal force (hereinafter, referred to as a centrifugal hydraulic) is developed in the working oil chamber. A trouble often occurs in a shift operation depending upon the piston or the revolution speed of the cylinder. That is to say, due to the development of the centrifugal hydraulic, the working oil pressure actually developed is higher than an intended working oil pressure. Thus, a shift shock occurs. As a measure against the centrifugal hydraulic, a Japanese Patent Application First Publication No. Heisei 2-292566 published on Dec. 4, 1990 exemplifies a previously proposed control apparatus for the automatic transmission in which the revolution speed of one of the clutches which is engaged (clutched) or released during the gear shift is detected and a clutch engagement pressure is controlled in dependence upon a square of the clutch revolution speed. Thus, with an influence of the centrifugal hydraulic largely developed taken into consideration, the clutch engagement pressure is reduced by a value corresponding to the influence of the centrifugal hydraulic. Then, a more accurate engagement pressure control is made possible.

As another measure against the centrifugal hydraulic, a frictional clutching (engagement) element of the automatic transmission is well known in which a, so-called, centrifugal hydraulic cancel chamber is installed so that the centrifugal hydraulic in the working oil chamber is cancelled with the centrifugal hydraulic in the centrifugal hydraulic cancel chamber. Thus, the centrifugal hydraulic measure has been taken without carrying out the above-described control. Hereinafter, the centrifugal hydraulic cancel chamber will specifically be described. FIG. 11 shows a diagrammatical cross sectional view indicating a generally available hydraulic clutch mechanism (a frictional clutching (engagement) element) 35 of the well known automatic transmission. The hydraulic clutch mechanism 35 mainly includes a piston 40 and a hydraulic multi-plate clutch (a frictional clutching (engagement) member) 50. Hydraulic multi-plate clutch 50 is disposed so as to limit a relative revolution between an input shaft of the transmission (turbine shaft) and one element of the planetary gear mechanism (planetary carrier). A plurality of clutch discs 50*b* and a plurality of clutch plates 50*a* are disposed alternatively. It is noted that each clutch disc 50*b* is meshed with a spline 42 of cylinder 41 integrally rotated with turbine shaft 10. This causes an integral rotation of each clutch 50*b* and turbine shaft 10. In addition, a clutch operating piston 40 is fitted into cylinder 41. When the working oil is supplied into an oil chamber formed between cylinder 41 and piston 40, piston 40 is driven in a leftward direction as viewed from FIG. 11 against a biasing force of a return spring 49 and is brought in contact with clutch disc 50*b*. When piston 40 is driven in the way described above, piston 40 presses each clutch disc 50*b* so that the frictional force between each clutch plate 50*a* and each clutch disc 50*b* limits the relative revolution between turbine shaft 10 and the carrier. Thus, these members are integrally revolved.

In addition, a wall member 46 such as to cover an inside of piston 40 is disposed at an opposite side to the side at which an oil pressure (hydraulic) chamber 45 of piston 40 is formed. This wall member 46 and piston 40 forms centrifugal hydraulic cancel chamber 47. It is noted that wall member 46 is fixed by cylinder 41 and the working oil is supplied to centrifugal hydraulic cancel chamber 47 via an oil hole (not shown). Hence, during the revolution of clutch mechanism 35, especially, during a high speed revolution, due to a centrifugal force, the working oil indicates a high pressure at, especially, an outer peripheral side within oil pressure chamber 45 so that a force to try to expand a volume of oil pressure chamber 45 is developed. At this time, due to the centrifugal force, the oil within oil pressure (centrifugal hydraulic) cancel chamber 47 simultaneously indicates a high pressure and the force to try to expand the volume of centrifugal hydraulic cancel chamber 47 is developed. Hence, a force acted upon piston 40 in an axial direction is cancelled. In addition, seal rings 48*a*, 48*b*, and 48*c* are installed on cylinder 41, piston 40, and wall chamber 46. These seal rings 48*a*, 48*b*, 48*c* hermetically seal oil pressure chamber 45 and centrifugal hydraulic cancel chamber 47 and slidably supports piston 40.

SUMMARY OF THE INVENTION

However, centrifugal hydraulic measures described in the BACKGROUND OF THE INVENTION are sufficient during the ordinary gear shift but are insufficient to achieve an appropriate engagement (clutching) operation in a case where the gear shift is carried out at a different vehicle speed from that during the ordinary gear shift. That is to say, even if centrifugal hydraulic cancel chamber 47 as described above is installed, the centrifugal oil pressure (hydraulic) in a radial direction is acted in an inner diameter portion of seal ring 48*a*, as shown in FIG. 12. Since the pressing force of seal ring 48*a* in proportion to this centrifugal hydraulic is increased, a slide resistance of piston 40 on seal ring 48*a* is increased in accordance with a pressing force of seal ring 48*a*. It is noted that the latter centrifugal measure described in the BACKGROUND OF THE INVENTION does not consider this situation. Hence, in a case where the gear shift is carried out at a drive point which is different from the shift map used during the ordinary gear shift, that is to say, at a different vehicle speed although the same throttle opening angle as the ordinary gear shift, the centrifugal hydraulic which is different from that during the ordinary gear shift is developed so that, if the hydraulic during the ordinary shift is maintained, the stroke of piston 40 is not appropriately carried out. That is to say, during the gear shift at a higher vehicle speed side than the ordinary gear shift, the slide resistance of piston 40 becomes larger than during the ordinary gear shift. Hence, the pressing force against piston 40 becomes insufficient so that the engagement (clutching) of the frictional engagement (clutching) element becomes delayed. During the gear shift at a lower vehicle speed side than the ordinary gear shift, the slide resistance of piston 40 becomes smaller than during the ordinary gear shift. Hence, the pressing force against piston 40 becomes excessively large and the engagement (clutching) of the frictional clutching (engagement) element becomes fast. Then, as a result of this, a shift shock occurs or a racing (a blowing up) of engine revolution occurs. It is noted that such an idea that the working hydraulic is set to correspond to a manual (shift) mode in which the gear shift is carried out by a different shift map from the ordinary gear shift and by the driver's shift operation may be considered. A great amount of memory capacity becomes needed and a tuning becomes complicated. Such problems as described above are not only developed in the seal ring 48*a* but also developed in the other seal rings 48*b*, 48*c* shown in FIG. 11.

It is, hence, an object of the present invention to provide control apparatus and method for an automatic transmission which are capable of achieving the engagement (clutching) operation at an appropriate timing.

According to one aspect of the present invention, there is provided a control apparatus for an automatic transmission, the automatic transmission comprising: a plurality of frictional clutching elements having a hydraulically operated piston and a frictional clutching member clutched when pressed by means of the piston; and a shift map determining a target shift stage on the basis of a drive point determined according to at least a throttle opening angle and a vehicle speed or parameter values corresponding to the throttle opening angle and the vehicle speed and the automatic transmission achieving a plurality of shift stages by a combination of a clutching or release of the plurality of frictional clutching elements, the control apparatus comprising: a piston revolution speed detecting section that detects a revolution speed of the piston of one of the frictional clutching elements clutched during a gear shift to a predetermined target shift stage; an ordinary gear shifting piston revolution speed calculating section that calculates the piston revolution speed at the same shift kind and at the same throttle opening angle or at a parameter value corresponding to the throttle opening angle when the automatic transmission carries out the gear shift to the predetermined target gear shift at the drive point different from during an ordinary gear shift during which the gear shift based on the shift map is carried out; an initial hydraulic setting section that sets an initial hydraulic by which the piston strokes in a direction in which the clutched frictional clutching element presses; an initial hydraulic reference value calculating section that calculates an initial hydraulic reference value which provides a reference value of the initial hydraulic from the shift kind and the throttle opening angle or from the parameter value corresponding to the throttle opening angle; and a correction quantity calculating section that calculates a correction quantity for the reference value of the initial hydraulic on the basis of squares of the revolution speed of the piston calculated by the ordinary gear shifting piston revolution speed calculating section and of the revolution of the piston detected by the piston revolution speed detecting section, the initial hydraulic setting section setting the initial hydraulic reference value to the initial hydraulic during the ordinary gear shift and correcting the initial hydraulic reference value by the correction quantity to set the corrected initial hydraulic reference value to the initial hydraulic when the gear shift to the predetermined target gear shift stage is carried out at the drive point different from during the ordinary gear shift.

According to another aspect of the present invention, there is provided a control method for an automatic transmission, the automatic transmission comprising: a plurality of frictional clutching elements having a hydraulically operated piston and a frictional clutching member clutched when pressed by means of the piston; and a shift map determining a target shift stage on the basis of a drive point determined according to at least a throttle opening angle and a vehicle speed or parameter values corresponding to the throttle opening angle and the vehicle speed and the automatic transmission achieving a plurality of shift stages by a combination of a clutching or release of the plurality of frictional clutching elements, the control method comprising: detecting a revolution speed of the piston of one of the frictional clutching elements clutched during a gear shift to a predetermined target shift stage; calculating the piston revolution speed at the same shift kind and at the same throttle opening angle or at a parameter value corresponding to the throttle opening angle when the automatic transmission carries out the gear shift to the predetermined target gear shift at the drive point different from during an ordinary gear shift during which the gear shift based on the shift map is carried out; setting an initial hydraulic by which the piston strokes in a direction in which the clutched frictional clutching element presses; calculating an initial hydraulic reference value which provides a reference value of the initial hydraulic from the shift kind and the throttle opening angle or from the parameter value corresponding to the throttle opening angle; and calculating a correction quantity for the reference value of the initial hydraulic on the basis of squares of the revolution speed of the piston calculated and of the revolution speed of the piston detected, the initial hydraulic reference value being set to the initial hydraulic during the ordinary gear shift and the initial hydraulic reference value being corrected by the correction quantity to set the corrected initial hydraulic reference value to the initial hydraulic when the gear shift to the predetermined target gear shift stage is carried out at the drive point different from during the ordinary gear shift.

According to a still another aspect of the present invention, there is provided a control apparatus for an automatic transmission, the automatic transmission comprising: a plurality of frictional clutching elements having a hydraulically operated piston and a frictional clutching member clutched when pressed by means of the piston; and a shift map determining a target shift stage on the basis of a drive point determined according to at least a throttle opening angle and a vehicle speed or parameter values corresponding to the throttle opening angle and the vehicle speed and the automatic transmission achieving a plurality of shift stages by a combination of a clutching or release of the plurality of frictional clutching elements, the control apparatus comprising: piston revolution speed detecting means for detecting a revolution speed of the piston of one of the frictional clutching elements clutched during a gear shift to a predetermined target shift stage; ordinary gear shifting piston revolution speed calculating means for calculating the piston revolution speed at the same shift kind and at the same throttle opening angle or at a parameter value corresponding to the throttle opening angle when the automatic transmission carries out the gear shift to the predetermined target gear shift at the drive point different from during an ordinary gear shift during which the gear shift based on the shift map is carried out; initial hydraulic setting means for setting an initial hydraulic by which the piston strokes in a direction in which the clutched frictional clutching element presses; initial hydraulic reference value calculating means for calculating an initial hydraulic reference value which provides a reference value of the initial hydraulic from the shift kind and the throttle opening angle or from the parameter value corresponding to the throttle opening angle; and correction quantity calculating means for calculating a correction quantity for the reference value of the initial hydraulic on the basis of squares of the revolution speed of the piston calculated by the ordinary gear shifting piston revolution speed calculating means and of the revolution of the piston detected by the piston revolution speed detecting means, the initial hydraulic setting means setting the initial hydraulic reference value to the initial hydraulic during the ordinary gear shift and correcting the initial hydraulic reference value by the correction quantity to set the corrected initial hydraulic reference value to the initial hydraulic when the gear shift to the predetermined target gear shift stage is carried out at the drive point different from during the ordinary gear shift.

This summary of the invention does not necessarily describe all necessary features so that the present invention may also be sub-combination of these described features.

BRIEF DESCRIPTION OF THE DRAWINGS

FIG. 3 is an explanatory view representing engagement states of frictional engagement elements at each shift stage of the control apparatus for the automatic transmission shown in FIG. 1.

DETAILED DESCRIPTION OF THE PREFERRED EMBODIMENT

Reference will hereinafter be made to the drawings in order to facilitate a better understanding of the present invention.

Figure 1:
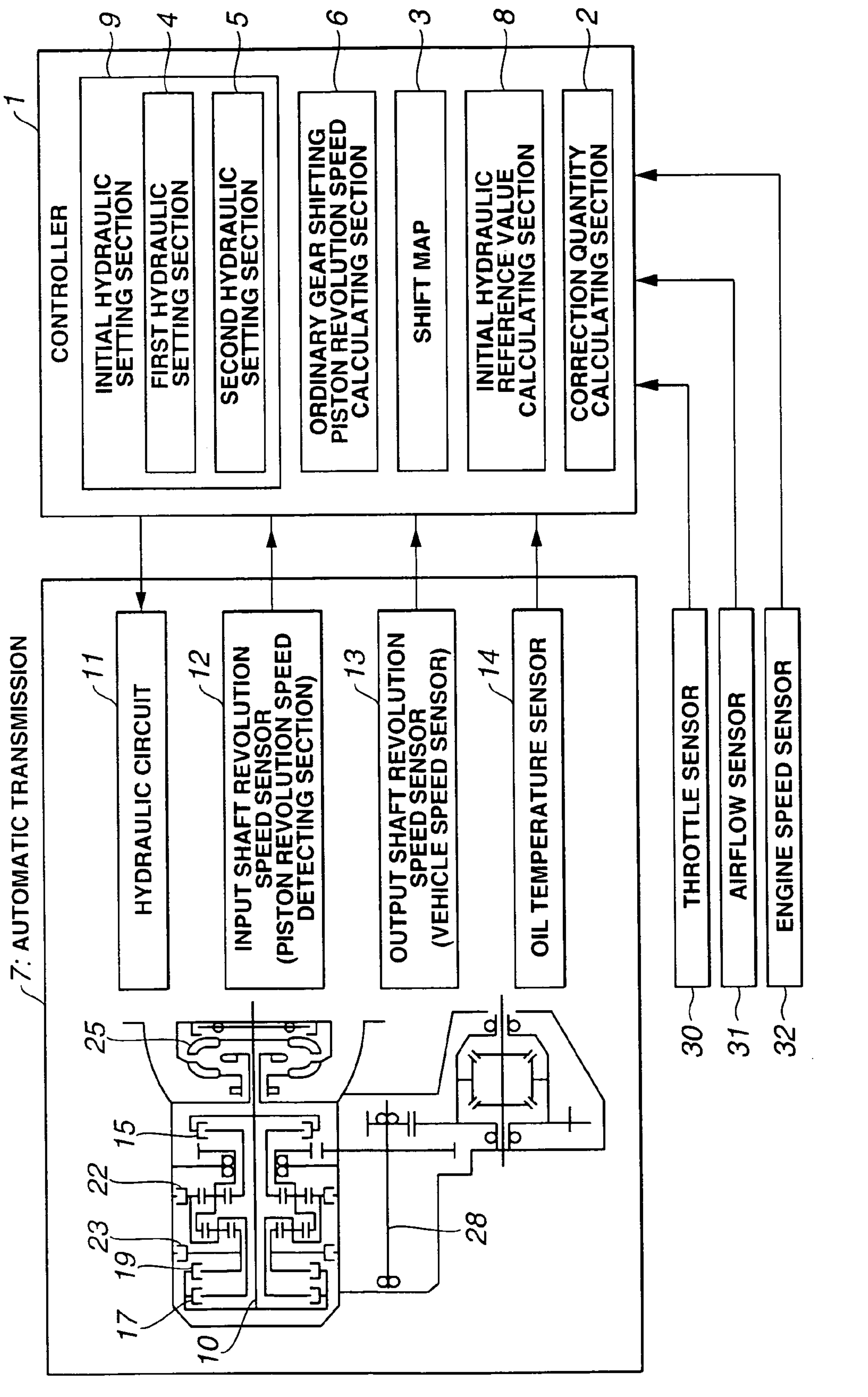
FIG. 1 is a diagrammatic view representing an essential structure of a control apparatus for an automatic transmission in a preferred embodiment according to the present invention.

FIG. 1 is a schematic functional block diagram of a control apparatus for an automatic transmission in a preferred embodiment according to the present invention. As shown in FIG. 1, control apparatus includes: a controller 1; an input shaft revolution speed sensor (piston revolution speed detecting section) 12 to detect a revolution speed $N_T$ of a turbine 25, namely, a turbine shaft 10; an output shaft revolution speed sensor (vehicle speed sensor) 13 to detect revolution speed $N_0$ of an output shaft 28; an oil temperature sensor 14 to detect an oil temperature of ATF (Automatic Transmission Fluid); a throttle sensor 30 to detect a throttle opening angle of an engine (not shown); an airflow sensor 31 to detect an intake air quantity of the engine; an engine speed sensor 32 to detect an engine speed; other various sensors; and a hydraulic circuit 11 of an automatic transmission. Controller 1 determines a desired target gear shift stage on the basis of detection signals from each sensor 12, 13, 13, 14, 30, 31, and 32 and performs a gear shift control to achieve a target gear shift stage via hydraulic circuit 11. It is noted that, in FIG. 1, a left side (a side far way from the engine) is a front side and a right side (engine side) is a rear side, for a convenience purpose.

Figure 2:
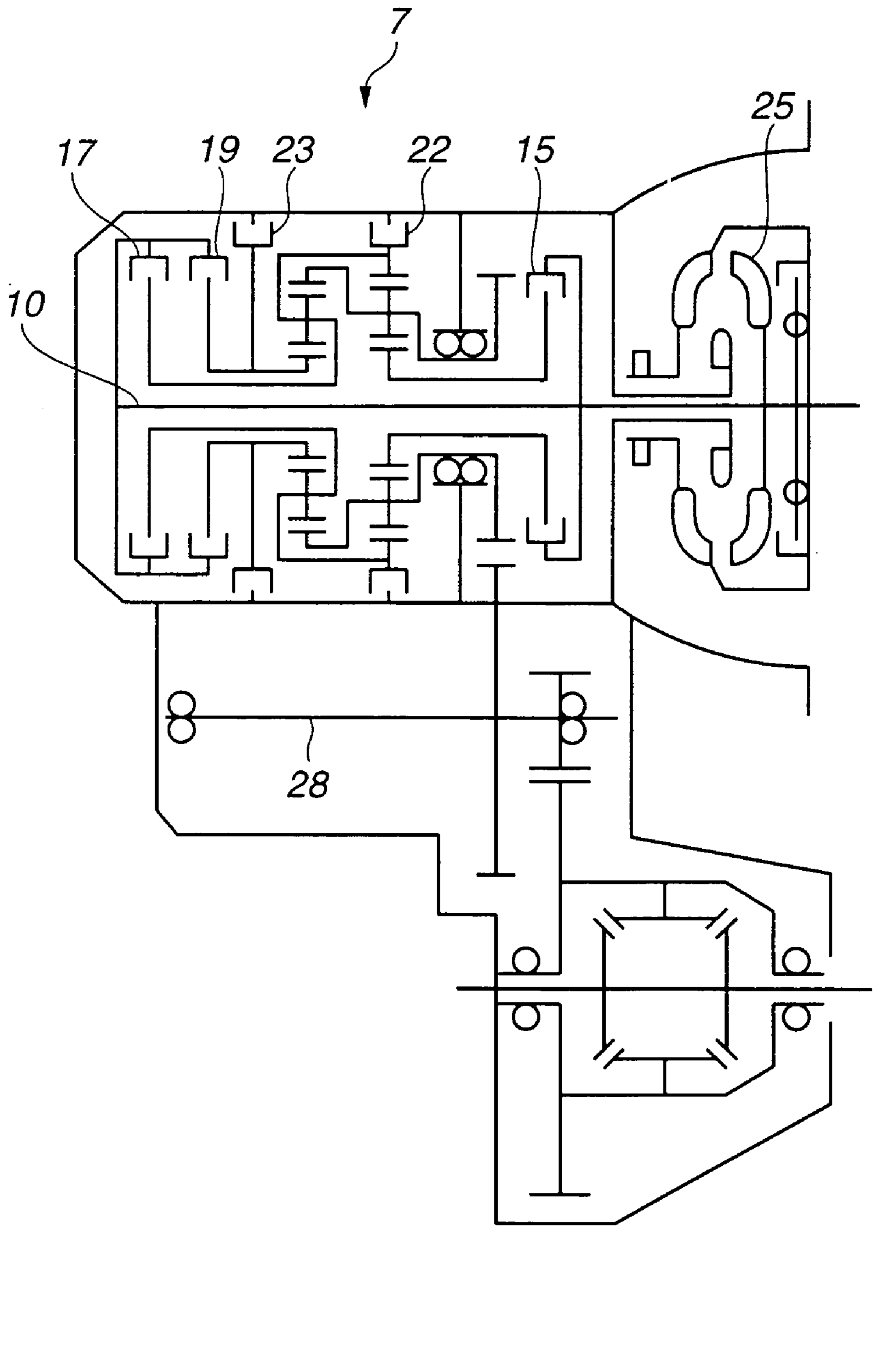
FIG. 2 is a skeleton view of the automatic transmission to which the present invention is applicable.

The gear stage of automatic transmission 7 is determined according to an engagement relationship of a planetary gear unit installed within automatic transmission 7 and frictional engagement (clutching) elements such as a plurality of hydraulic clutches and hydraulic brakes. For example, in FIG. 1, automatic transmission 7 is in the case of four speed shift range and, as frictional engagement (clutching) elements, a first clutch 14, a second clutch 17, a third clutch 19, a first brake 22, and a second brake 23 are installed. It is noted that the details of automatic transmission 7 are shown in FIG. 2. Reference numerals denoting the respective frictional engagement elements correspond to those shown in FIG. 2.

The control over frictional Clutching (engagement) elements 15, 17, 19, 22, 23 by means of controller 1 is carried out via hydraulic circuit 11 shown in FIG. 1. That is to say, in hydraulic circuit 11, a plurality of solenoid valves (not shown) are installed. The ATF supplied from oil pump is supplied to frictional clutching (engagement) elements 15, 17, 19, 22, 23 by appropriately driving (duty control) these solenoid valves. Controller 1 determines a target shift stage on the basis of the throttle opening angle detected by throttle sensor 30 and a vehicle speed calculated on the basis of a revolution speed $N_O$ of output shaft 28 detected by means of output shaft revolution speed sensor 13 and outputs drive signals (duty ratio signal) to solenoid valves of frictional engagement (clutching) elements 15, 17, 19, 22, 23 corresponding to the gear shift to the determined target gear shift stage. It is noted that ATF is pressure adjusted to a predetermined oil pressure (line pressure) by means of a regulator valve (not shown). The ATF adjusted to the line pressure is supplied to hydraulic circuit 11 to operate respective frictional clutching (engagement) elements 15, 17, 19, 22, 23.

In addition, as shown in FIG. 1, controller 1 functionally includes a correction quantity calculating section 2, an initial hydraulic (oil pressure) setting section 9, an ordinary gear shifting piston revolution speed calculating section 6, and an initial hydraulic reference value calculating section 8. In addition, initial hydraulic (oil pressure) setting section 9 includes a first hydraulic setting section 4 and a second hydraulic setting section 5. First hydraulic setting section 4 serves to eliminate an ineffective stroke of a piston by supplying a high pressure hydraulic for the clutch to be engaged (clutched frictional clutching element) for a predetermined time, namely, to execute a, so-called, looseness fit. Second hydraulic setting section 5 serves to perform a hydraulic command issuance whose pressure is lower than a high pressure hydraulic command.

Figure 11:
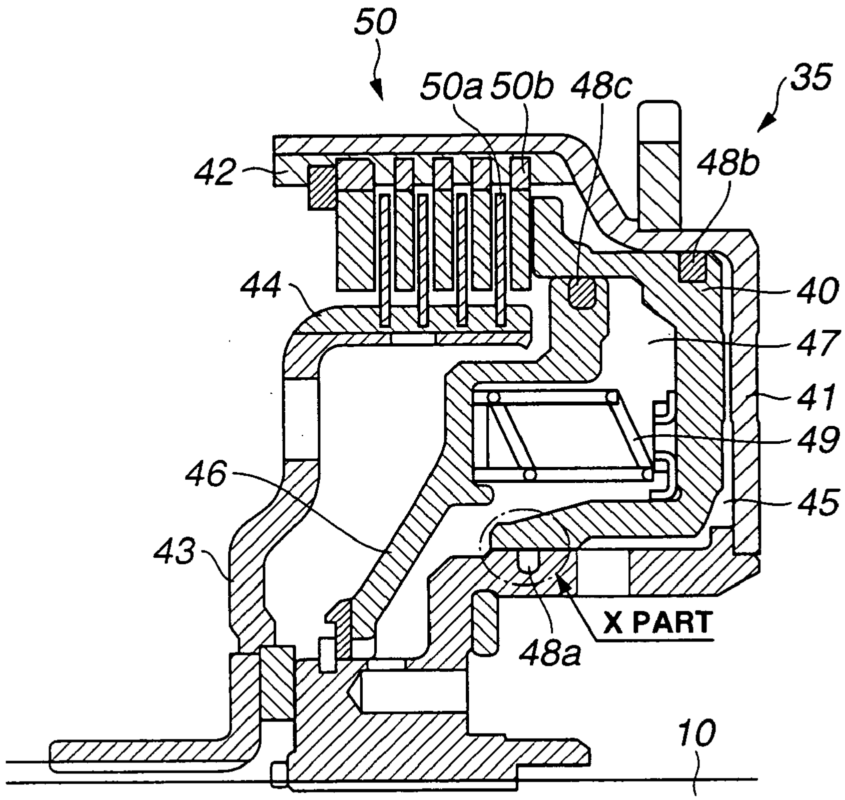
FIG. 11 is a cross sectional view representing a hydraulic clutch mechanism of a generally available automatic transmission.
Figure 12:
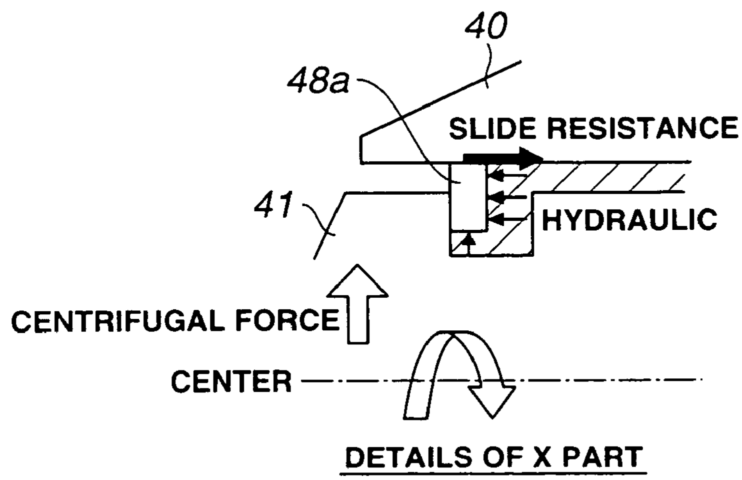
FIG. 12 is a diagrammatical enlarged explanatory view representing an X part shown in FIG. 11 for explaining a solution to be solved by the present invention.

At least second clutch 17 from among frictional engagement (clutching) elements 15, 17, 19, 22, 23 installed within automatic transmission 7 is constituted in the same way as clutch mechanism 35 described with reference to FIGS. 11 and 12. In second clutch 17, a piston 40 is fitted into a cylinder 41 which is integrally revolved with turbine shaft 10, thereby piston 40 being integrally revolved with turbine shaft 10. Then, in automatic transmission 7, a switch lever (not shown) to switch a drive mode is installed. By operating this switch lever by a vehicular driver, a selection of a shift range from among a parking range, running range (for example, first through fourth speed stages), a neutral range, and a reverse (backward) range is manually made. In addition, two modes of an automatic shift mode and a manual shift mode are provided in this running range. When the automatic shift mode is selected, the automatic shift is executed (hereinafter, referred to as an ordinary shift or a standard shift) in accordance with a preset shift map based on a throttle opening angle $\theta_{TH}$ and vehicle speed V as will be described later. On the other hand, if the manual mode is selected, the shift stage is shifted to the selected gear shift stage irrespective of a shift map 3 and, thereafter, fixed.

Figure 10A:
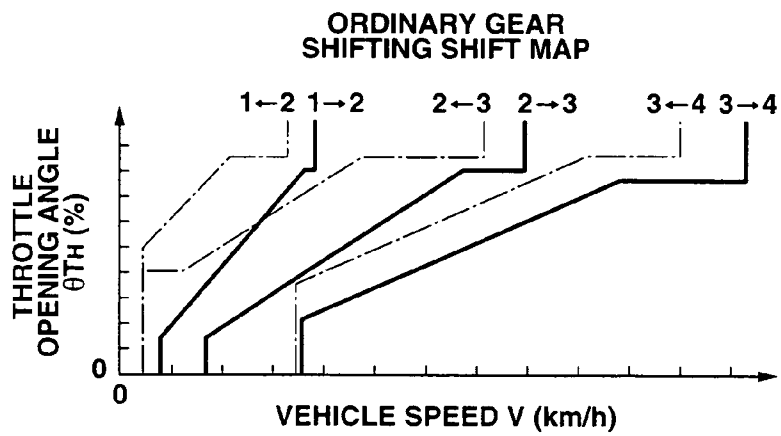
FIGS. 10A and 10B are respectively shift maps for the control apparatus for the automatic transmission shown in FIG. 1, FIG. 11A representing an ordinary gear shift map and FIG. 11B representing a high oil temperature shift map.

As a shift map 3, a shift map other than an ordinary gear shift is installed other than the shift map (refer to FIG. 10A) used during the ordinary gear shift. This will be described later. Then, during the ordinary gear shift, namely, during the gear shift at which the target gear shift stage is set according to the shift map for the ordinary gear shift purpose shift map as shown in FIG. 10A and the switch lever is selected in the automatic gear shift mode of the running range, the frictional engagement (clutching) elements of first through third clutches and first through second brakes 22 through 23 are controlled by means of solenoid valves set respectively. A combination of the clutching (engagement) or the release as shown in FIG. 3 automatically establish each shift stage. It is noted that a mark of a circle ○ shown in FIG. 3 denotes the coupling (clutching or engagement) of each clutch or each brake.

Then, as shown in FIG. 3, for example, first clutch 15 and second clutch 23 are coupled (clutched or engaged) and second clutch 17, third clutch 19, and first brake 22 are released, a second speed stage can be achieved. In addition, the gear shift from the second stage to the third stage is carried out in such a way that the coupled (clutched or engaged) second brake 23 is released and the second clutch 17 is coupled (clutched or engaged). The coupling (clutching) state of these frictional engagement (clutching) elements 15, 17, 19, 22, 23 is controlled by means of controller 1. The coupling (clutching) relationship of these frictional clutching elements 15, 17, 19, 22, 23 determines the shift stage and the shift control is carried out by appropriately taking timings of the couplings (clutchings or engagements) and releases of these frictional engagement (clutching) elements 15, 17, 19, 22, 23. During the gear shift, the drive signal is outputted from controller 1 to each solenoid valve. On the basis of the drive signal, each solenoid valve is driven by a predetermined duty ratio and an optimum gear shift control having a good shift feeling is executed. Hereinafter, an up-shift gear shift control in the ordinary gear shift will be explained with the up-shift from a first speed stage to a third speed stage exemplified with reference to FIGS. 4 through 8D, and FIG. 11. It is noted that the coupling (engagement) side frictional engagement element during the up-shift, viz., 1-2 up-shift from the first speed stage to the second speed stage refers to second brake 23, during the up-shift, viz., 2-3 up-shift from the second speed stage to the third speed stage, refers to second clutch 17, and during the up-shift, viz., 3-4 up-shift from the third speed stage to the fourth speed stage, refers to second brake 23, respectively. The release side frictional element, during 1-2 up-shift, refers to first brake 22, during 2-3 up-shift, refers to second brake 23, during 3-4 up-shift, refers to first clutch 15, respectively.

Figure 6:
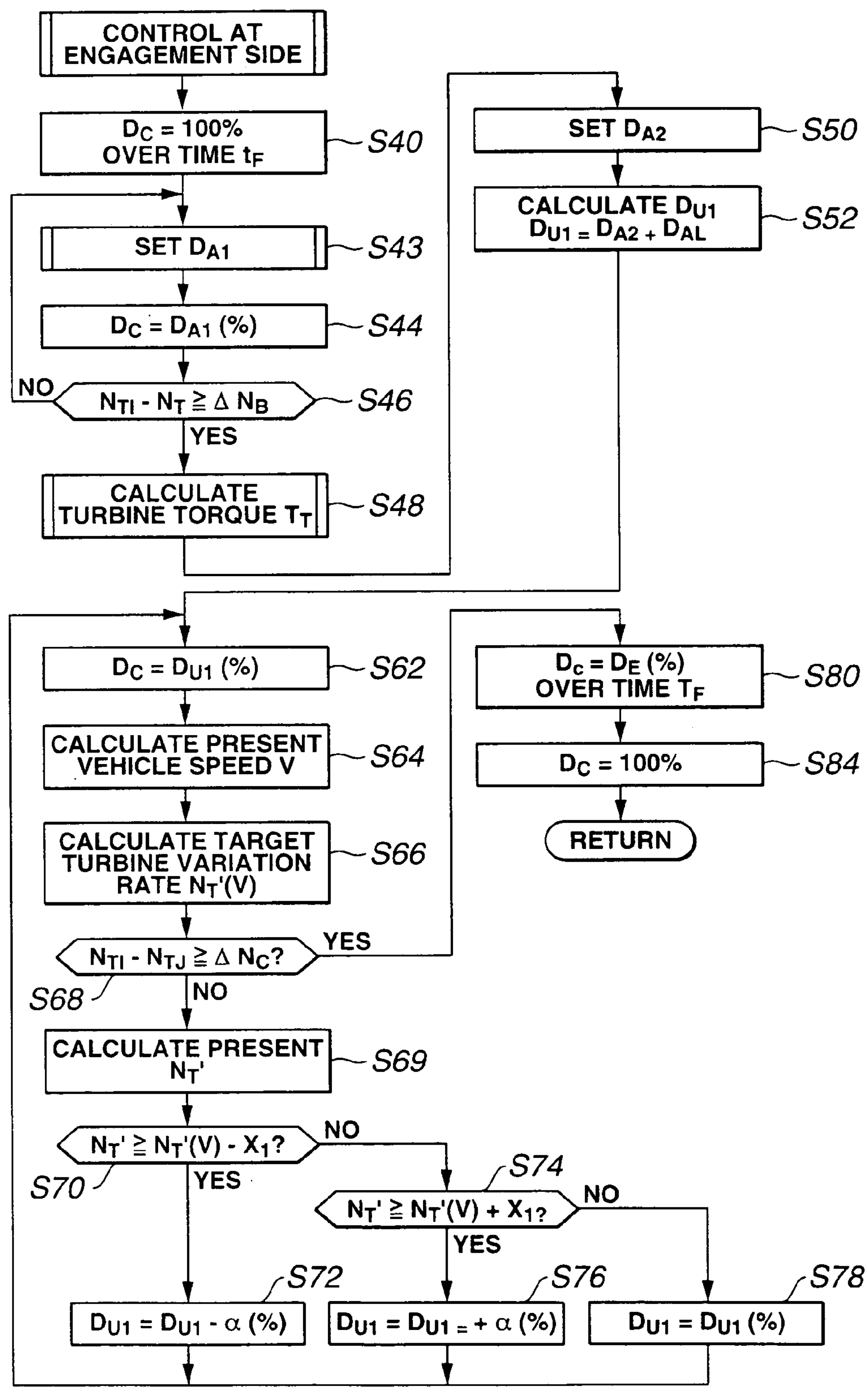
FIG. 6 is a flowchart representing an engagement side control during the up-shift in the control apparatus for the automatic transmission shown in FIG. 1.
Figure 7:
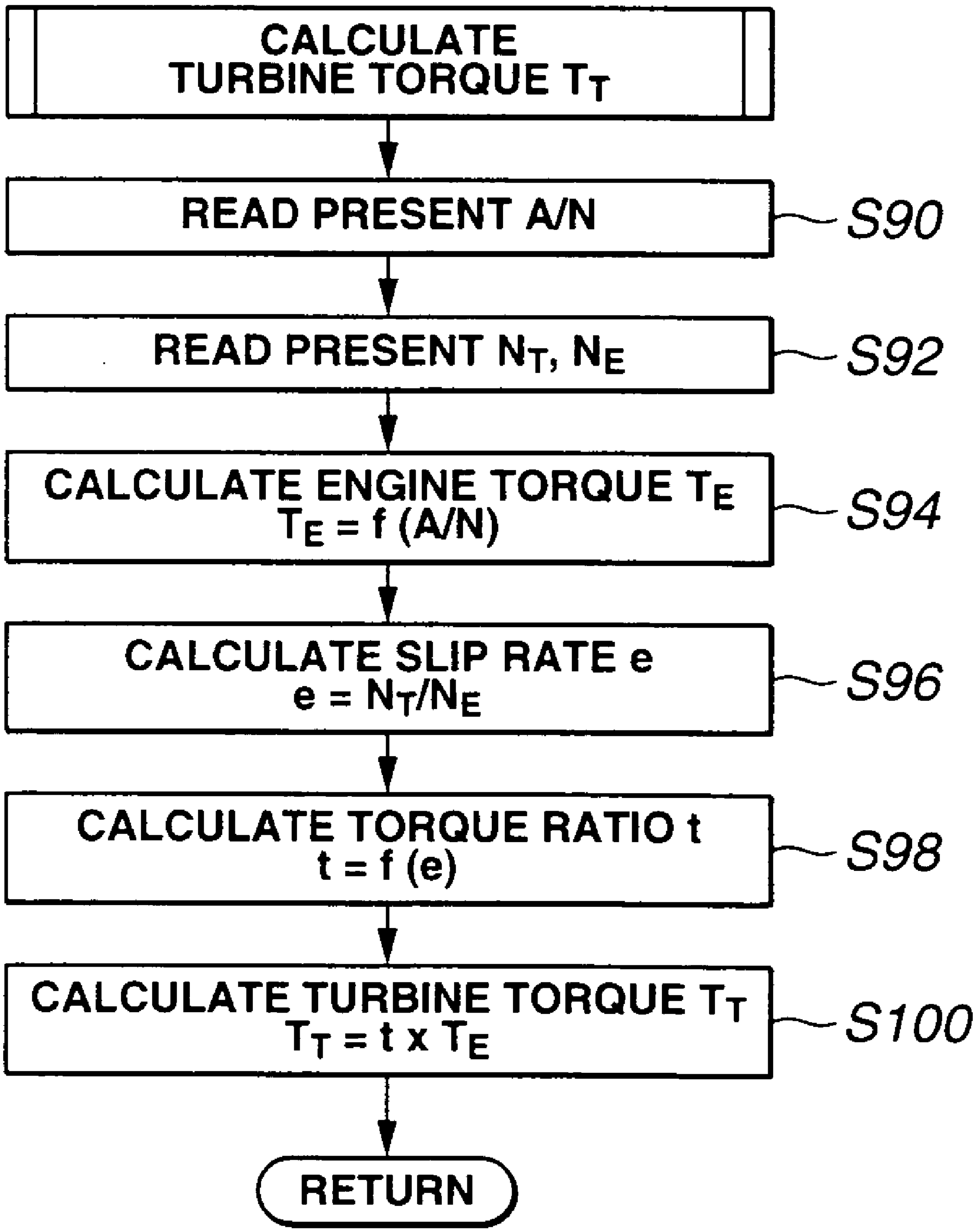
FIG. 7 is a flowchart representing a subroutine of a turbine torque calculation for the control apparatus for the automatic transmission shown in FIG. 1.
Figures 8A, 8B, 8C, 8D:
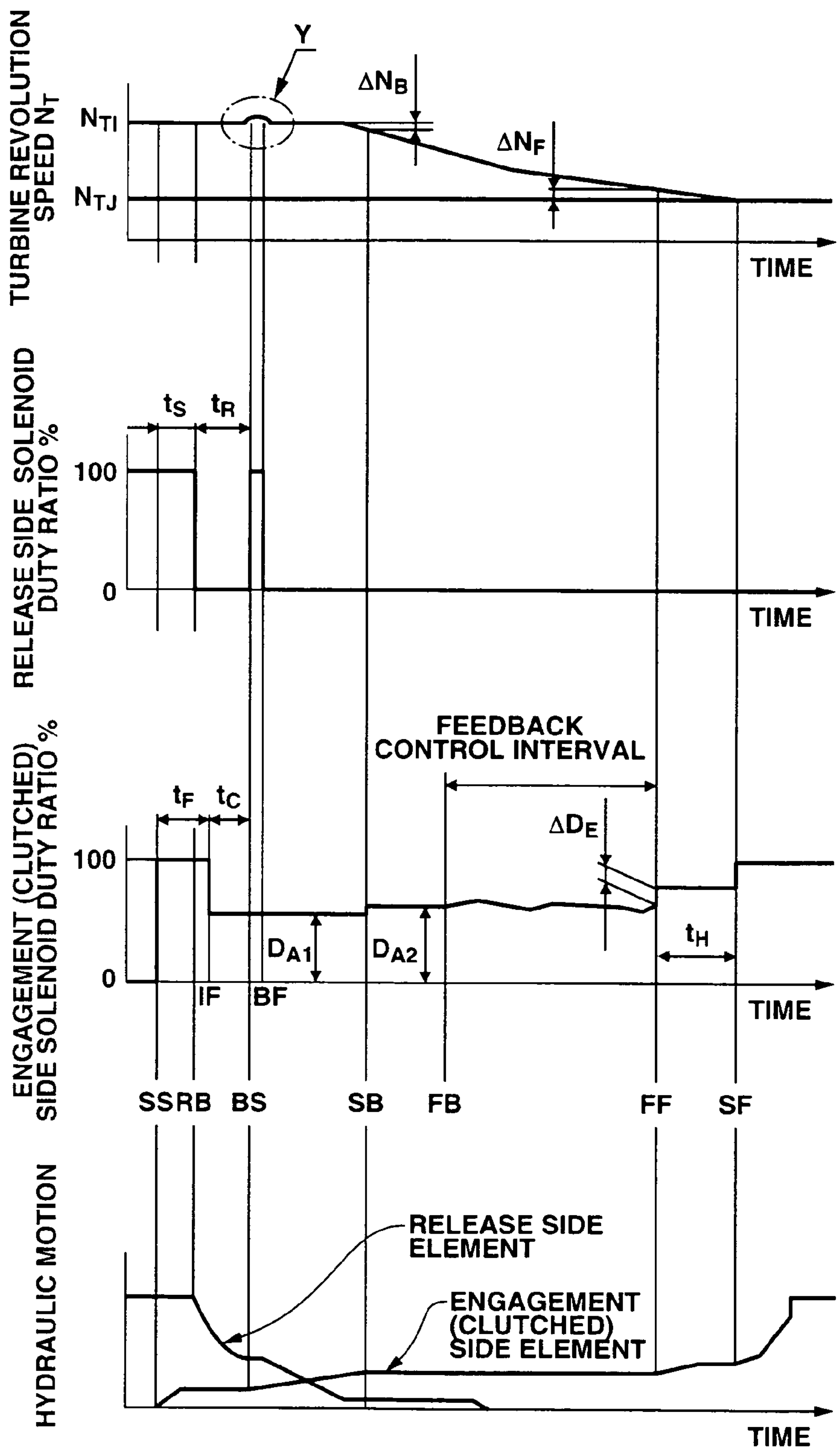
FIGS. 8A, 8B, 8C, and 8D are integrally a timing chart for explaining a gear shift timing for the control apparatus for the automatic transmission shown in FIG. 1.

FIGS. 4 through 7 show flowcharts representing up-shift gear shift control that controller 1 executes during the power on up-shift. FIGS. 8A through 8D show integrally a timing chart for explaining the control timing. FIG. 8A shows the timing chart for explaining revolution speed $N_T$ of turbine 25. FIG. 8B show the timing chart for explaining a duty ratio of a release side solenoid (a solenoid to drive second brake 23). FIG. 8C shows the timing chart for explaining a duty ratio of the coupling (clutching or engagement) side solenoid (a solenoid to drive second clutch 17). FIG. 8D shows the timing chart for explaining hydraulics of second brake 23 (release side frictional clutching element) and second clutch 17 (coupling side (clutching side or engagement side) frictional clutching element). In addition, FIG. 11 shows hydraulic clutch mechanism 35 of the generally available automatic transmission. Since second clutch 17 has the same structure as hydraulic clutch mechanism 35, this is used in the explanation of the control apparatus for the automatic transmission in the preferred embodiment according to the present invention.

First, an up-shift control routine which is a main control during a power on up-shift from the second speed stage to the third speed stage will be described with reference to FIG.

Figure 5:
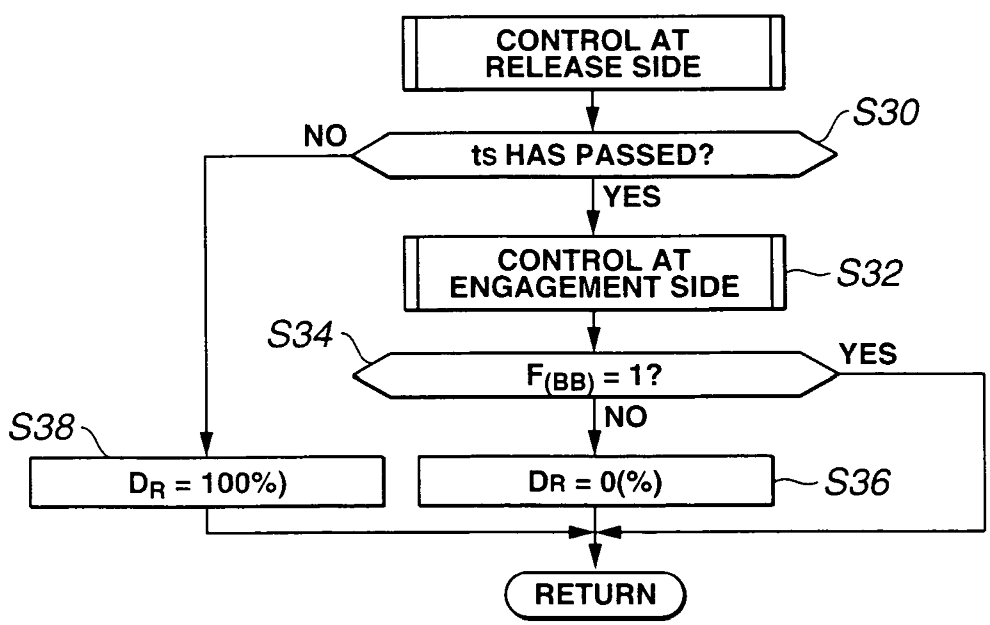
FIG. 5 is a flowchart representing a subroutine of a release side control during the up-shift in the control apparatus for the automatic transmission shown in FIG. 1.

4. At a step S14, a release side control to control the duty ratio to control duty ratio $D_R$ of a release side solenoid valve of the frictional clutching (engagement) element is executed. For the release side control, a subroutine shown in FIG. 5 is executed. In FIG. 5, a shift command (SS) from the second speed stage to the third speed stage is outputted at a time point SS. At a step S30, controller 1 determines whether a predetermined time ts has passed from a time at which 2-3 up-shift is started. This predetermined time ts is set as a difference ($ts=t_F+t_C-t_R$) between a sum ($t_F+t_C$) of a fit looseness time $t_F$ during which the hydraulic is supplied to coupling (engagement) side second clutch 17 to carry out a fit looseness operation and time $t_C$ at which the fit looseness time $t_F$ has passed and until which a re-supply of the hydraulic as will be described later is started and hydraulic release time $t_R$ from release side second brake 23. The value of predetermined time ts is varied along with the corrections of these hydraulic release time $t_R$ and fit looseness time $t_F$ by means of a learning for these times $t_R$ and $t_F$.

If a result of a determination at step S30 is negative (No) and controller 1 determines that predetermined time ts is not yet ended, the routine goes to a step S38 at which a duty ratio $D_R$ is maintained at 100%. The operating hydraulic is the line pressure at step S38. Then, the routine returns to a step S16 in FIG. 4. On the other hand, if the result of the determination at step S30 is Yes (positive), the routine goes to a step 32 at which a re-coupling control is executed. At the re-coupling (re-engagement) control of step S32. a hydraulic re-supply in which, after the release is once started, the hydraulic is supplied again (re-supplied) to release side second brake 23 is executed. It is noted that, in the up-shift, as shown in FIG. 8A, after the hydraulic is released with the duty ratio supplied to the solenoid valve of release side second brake 23 is set to 0% so that the hydraulic is released, release side second brake 23 and coupling (clutched) side (engagement side) second clutch 17 are not engaged. Turbine 25 is in a free running state and a blowing up of this turbine 25 often occurs (as denoted by Y in FIG. 8A).

When the blowing up of turbine 25 occurs, a shock occurs when the coupling side (engagement side) second clutch 17 is engaged (clutched) so that a shift feeling becomes worsened. Then, the blowing up of turbine 25 occurs and after confirming that turbine revolution speed $N_T$ is in excess of a synchronous revolution speed $N_{TI}$ of turbine 25 at the second speed stage before the gear shift occurs, the hydraulic of 100% duty ratio is re-supplied (supplied again) to second brake 23 for a predetermined time. In this way, duty ratio $D_R$ is controlled by means of a re-coupling (re-engagement) control and the re-supply of the hydraulic is executed. At this time, second brake 23 is re-engaged only for the predetermined time. As shown in FIGS. 8A through 8D, the working hydraulic at the release side is increased for the predetermined time so that the blowing up of turbine 25 is sufficiently suppressed. Then, a blowing up quantity of turbine 25 becomes small and turbine revolution speed difference ($N_T-N_{TI}$) is equal to or below predetermined value. At this time, duty ratio $D_R$ is again finally returned to 0%. However, the details of the re-coupling (re-engagement) control will herein be omitted. It is noted that synchronous revolution speed $N_{TI}$ is calculated by multiplying output shaft revolution speed $N_O$ of automatic transmission 7 with a gear ratio of the shift stage (in this case, second gear stage).

At a step S34, controller 1 determines whether, according to the execution of the re-coupling control of step S32, a hydraulic re-supply is carried out depending upon a value of a flag $F_{(BB)}$ at which a value 1 is set after the end of the execution of re-supply of the hydraulic. Immediately after the release control start, the blowing up of turbine 25 does not occur. The hydraulic re-supply by means of the re-coupling control is not immediately carried out. Since, in this case, a value of flag $_{(BB)}$ is not 1 (value of 0) and the result of the determination is No (negative) at step S34, the routine goes to the nest step S36.

At step S36, the release of the hydraulic from second brake 23 is carried out by setting duty ratio $D_R$ to 0%. Then, the routine returns to step S16. Immediately after predetermined time ts has passed according to the determination of step S30, the execution of step S36 causes the release of hydraulic is started. When the release of the hydraulic is started, duty ratio $D_R$ which has been set to 100% gives 0% when receiving the command from controller 1 as shown in FIGS. 8A trough 8D. Then, the solenoid valve is started to be de-energized. At this time, the working hydraulic is started to be decreased as a hydraulic diagram at the release side shown in FIGS. 8A through 8D.

Figure 4:
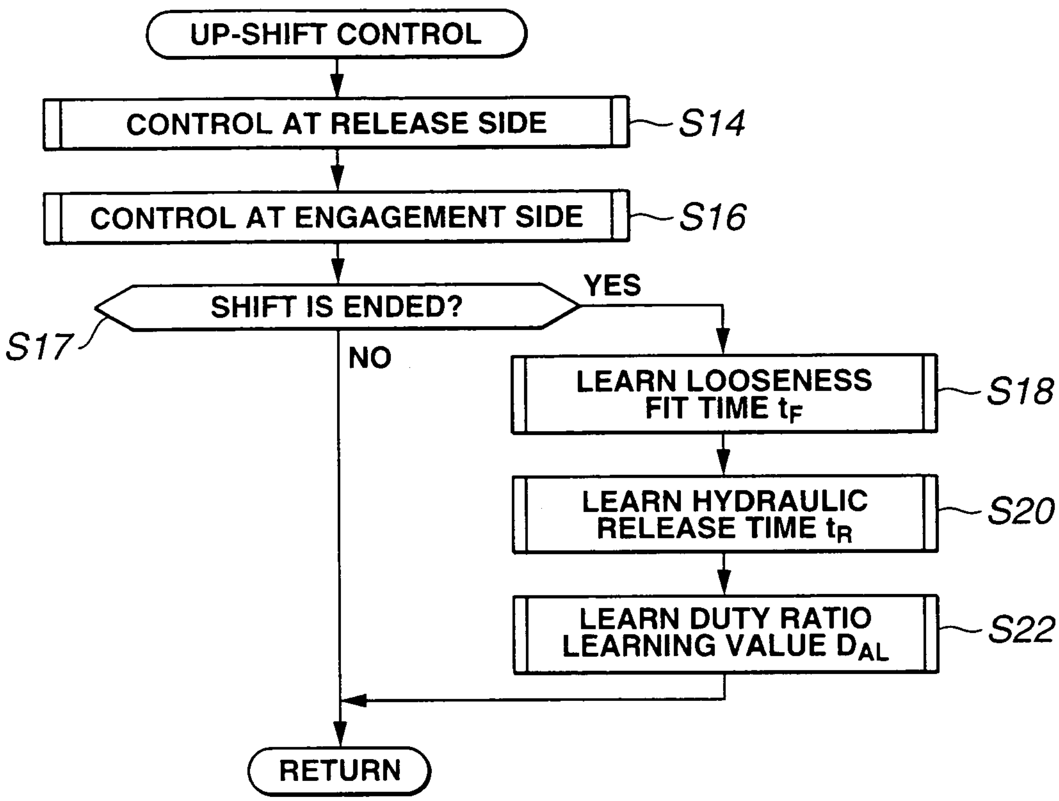
FIG. 4 is a flowchart representing a control routine during an up-shift of the control apparatus for the automatic transmission.

On the other hand, at step 34, in a case where flag $F_{(BB)}$ is a value of 1 and controller 1 determines that the re-supply of the hydraulic is carried out at the above-described re-coupling (re-engagement) control, duty ratio $D_R$ to be supplied to the solenoid valve of second brake 23 is in accordance with re-coupling control, nothing is carried out, and the routine goes to step S16 in FIG. 4. It is noted that, flag $F_{(BB)}$ set to value 1 is again reset to value 0 when this 2-3 up-shift is ended.

At step S16 in FIG. 4, a coupling control (engagement side control) to control duty ratio $D_C$ at the coupling side is executed. It is noted that, in the coupling (clutching or engagement) side control, the control at the clutching (engagement) side is specifically carried out on the basis of a flowchart of a subroutine shown in FIG. 6.

That is to say, at a step S40 in FIG. 6, when the gear shift command (SS) is outputted from controller 1 at time point of SS as shown in FIGS. 8A through 8D, the looseness fit operation for predetermined looseness fit time $t_F$ as described above is carried out. This looseness fit operation is to eliminate the ineffective stroke of second clutch 17. Duty ratio $D_C$ is set to 100% for its operation to be fastest. Then, the working oil of the line pressure is supplied to second clutch 17. Thus, the oil pressure at the engagement (coupling or clutched) side is gradually increased as shown in the hydraulic diagram of FIG. 8D. It is noted that, in order to eliminate the ineffective stroke of the piston as described above, the hydraulic command once at a high pressure which is carried out at the initial stage of the gear shift (in this embodiment, duty ratio $D_C$ is once set to 100%) is called a pre-charge.

The looseness fit of second clutch 17 by means of this pre-charge is carried out by a predetermined fit looseness time $t_F$ (this is a function of first hydraulic setting section 4). After the passage of looseness fit time $t_F$ (a time point IF), the engagement (clutched) side solenoid duty ratio is reduced to a predetermined initial duty ratio $D_{A1}$ (this is a function of second hydraulic setting section 5). However, at time point IF, the looseness fit is not actually finished. The actual end of the looseness fit is after the passage of time $t_C$. The reason that the duty ratio is reduced to the predetermined initial duty ratio $D_{A1}$ is that before second clutch 17 is coupled (engaged) before the end of the release of second brake 23, second brake 23 and second clutch 17 are interlocked and a hunting or shock is caused to occur. After the looseness is fitted to some degree, the hydraulic to be given is dropped and an abrupt coupling (clutching or engagement) is prevented from occurring.

It is noted that this looseness fit time $t_F$ is corrected by a learning. Then, after fit looseness time $t_F$ is passed, the routine goes to a step S43. This step S43 is a step to set duty ratio $D_C$ to be outputted to solenoid valve of second clutch 17 after the passage of fit looseness time $t_F$ to an initial duty ratio $D_{A1}$ on the basis of a flowchart of a subroutine shown in FIG. 9. It is noted that the present invention has a feature of a technique of setting this initial duty ratio $D_{A1}$. The details of this setting technique will be described later. However, when the gear shift is carried out at a different drive point from that during the ordinary gear shift (when the automatic transmission is driven using a shift map different from the ordinary gear shift map), initial duty ratio $D_{A1}$ is corrected on the basis of a difference of each square of the revolution speed (or turbine revolution speed) of piston 40 calculated by ordinary gear shifting piston revolution speed calculating section 6 and the revolution speed of piston 40 (or turbine revolution speed) detected by input shaft revolution speed sensor (piston revolution speed detecting section) 12.

At a step S44 in FIG. 6, controller 1 sets duty ratio $D_C$ of the hydraulic supplied to the coupling (engagement) side second clutch 17 to initial duty ratio $D_{A1}$. Then, the engagement (coupling) of clutch plate 50*a* and clutch disc 50*b* is started. When the revolution speed difference between these plate and discs is started to be reduced, as shown in FIG. 8A, revolution speed $N_T$ of turbine 25 is started to be reduced from synchronous revolution speed $N_{TI}$ at the second speed stage toward synchronous revolution speed $N_{TJ}$ at the third stage.

At a step S46, controller 1 determines whether a deviation ($N_{TI}-N_T$) between turbine revolution speed $N_T$ thus started to be reduced and synchronous revolution speed $N_{TI}$ at the second stage is equal to or higher than a predetermined value $\Delta N_B$ (for example, 50 rpm). If a result of this determination is No (negative) at step S46, namely, deviation ($N_{TI}-N_T$) is smaller than predetermined value $\Delta N_B$, the routine returns to step S43 at which the calculation of initial duty ratio $D_{A1}$ is carried out. At step S44, duty ratio $D_C$ supplied to second clutch 17 at the coupling (engagement) side is set to initial duty ratio $D_{A1}$.

On the other hand, if the result of determination at step S46 is yes (positive), namely, deviation ($N_{TI}-N_T$) is equal to or higher than a predetermined value $\Delta N_B$, the routine goes to the next step S48. It is noted that at a time point at which this deviation ($N_{TI}-N_T$) has reached to predetermined value $\Delta N_8$ is an SB time point for convenience purpose as shown in FIGS. 8A through 8D. Steps S48 through S100 are a preparation time interval to execute the feedback control. At a step S48, a calculation of a turbine torque $T_T$ transmitted from engine to turbine 25 is executed in accordance with a flowchart of FIG. 7.

Hereinafter, the calculation of turbine torque $T_T$ will briefly be described with reference to FIG. 7. At a step S90, controller 1 reads the present A/N (an intake air quantity per one suction stroke). This A/N is calculated on the basis of an input information from airflow sensor 31. At the next step S92, controller 1 reads the present turbine revolution speed $N_T$ and engine speed $N_E$ on the basis of the input information from input shaft revolution speed sensor 12 and turbine revolution speed (engine speed) sensor 32, respectively.

At a step S94, controller 1 calculates an engine torque $T_E$ from the present A/N read at step S90. This engine torque $T_E$ is represented as a function of A/N as expressed in the following equation (1).

$$T_E=f(A/N) \quad (1).$$

It is noted that, the A/N is, herein, used to derive engine torque $T_E$. In place of the A/N, engine torque $T_E$ may be derived on the basis of these values of throttle opening angle $\theta_{TH}$ detected by means of throttle sensor 30 and engine speed $N_E$.

At the next step S96, controller 1 calculates a slip rate e from present turbine revolution speed $N_T$ read at step S92 and engine speed $N_E$ using the following equation (2).

$$e=N_T/N_E \quad (2).$$

Then, at the next step S98, controller 1 calculates a torque ratio t between engine torque $T_E$ and turbine torque $T_T$ on the basis of slip rate e using the following equation (3).

$$t=f(e) \quad (3).$$

Finally, at the next step 100, controller 1 calculates a turbine torque $T_T$ using the following equation (4) on the basis of torque ratio t and engine torque $T_E$.

$$T_T=t\times T_E \quad (4).$$

After turbine torque $T_T$ is derived as described above, the routine goes to a step S50 in FIG. 6.

At step S50, controller 1 sets a reference duty $D_{A2}$ during the start of the feedback control start. This reference duty ratio $D_{A2}$ is determined by experiments and is set on the basis of a map (not shown) representing a relationship between turbine torque $T_T$ stored in controller 1 functioning as an addition means previously and reference duty ratio $D_{A2}$. After reference duty ratio $D_{A2}$ is set according to this map, the routine goes to the next step S52.

At step S52, controller 1 calculates a feedback control duty ratio $D_{U1}$ related to the start supply hydraulic on the basis of reference duty ratio $D_{A2}$ and a duty ratio learning value $D_{AL}$ using the following equation (5).

$$D_{U1}=D_{A2}+D_{AL} \quad (5).$$

It is noted that duty ratio learning value $D_{AL}$ is a value to correct reference duty ratio $D_{A2}$ during the feedback control start time to an appropriate value and is a value to be learned during the previous shift control end (refer to step S22 in FIG. 4).

Steps after a step S62 are steps to carry out the feedback control. At step S62, controller 1 sets the coupling (engagement) side duty ratio $D_C$ to feedback control duty ratio $D_{U1}$. At the next step S64, controller 1 calculates present vehicle speed V on the basis of the input signal from vehicle speed sensor 13. At the next step S66, controller 1 derives a target turbine speed variation rate $N_T'(V)$. This target turbine speed variation rate $N_T'(V)$ is represented in a linear function of vehicle speed V. A relationship between this target turbine speed variation rate $N_T'(V)$ and vehicle speed V is set by the experiments for the gear shift to be finished for a predetermined gear shift time $t_{SFT}$ (for example, 0.7 sec.) and is previously stored as a map in controller 1. Hence, at this stage, controller 1 reads target turbine speed variation rate $N_T'(V)$ corresponding to the present vehicle speed V from this map. In the case of the up-shift, target turbine speed variation rate $N_T'(V)$ indicates a negative value and this value is increased in the negative direction as vehicle speed V becomes large (namely, becomes reduced) and its variation gradient becomes large.

The next step S68 is a step to determine whether the gear shift is approached to the end. Specifically, controller 1 determines whether a difference ($N_T-N_{TJ}$) between turbine revolution speed $N_T$ and synchronous revolution speed $N_{TJ}$ at the third speed stage (range) after the gear shift is equal to or smaller than a predetermined value ΔNc. If the result of determination is No (negative) at step S68, controller 1 can determine that the gear shift is not yet approached to the end and the routine goes to a step S69. If Yes (positive) at step S68, the routine goes to a step S80 as will be described later.

At step S69, controller 1 calculates present turbine speed variation rate $N'_T$ on the basis of the actually measured value. As the calculation method, present turbine speed variation rate $N_T'$ is calculated from the variation quantity of turbine speed $N_T$ within the predetermined time. Then, at a step S70, controller 1 determines whether present turbine speed variation rate $N_T'$ is equal to or smaller than a range of a negative side predetermined allowance value $X_1$ (for example, 3REV/$S^2$) of target turbine speed variation rate $N_T'$ derived at step S70 ($N_T' \leqq N_T'(V)-X_1$).

If the result of determination is Yes (positive) at step S70, namely, present turbine speed variation rate $N_T'$ is equal to or lower than the range of predetermined allowance value $X_1$ of target turbine speed variation rate $N_T'(V)$, controller 1 can determine that the working hydraulic supplied to second clutch 17 is high so that the engagement (coupling or clutching) is too fast. At the next step S72, feedback control duty ratio $D_{U1}$ is made small by a predetermined correction value α ($D_{U1}=D_{U1}-\alpha$). Thus, the working hydraulic supplied to second clutch 17 is decreased and present turbine speed variation rate $N_T'$ approaches to target turbine speed variation rate $N_T'(V)$.

On the other hand, if the result of determination at step S70 is No (negative), namely, if present turbine speed variation rate $N_T'$ is larger than the range of the negative side predetermined allowance value $X_1$ of target turbine speed variation rate $N_T'(V)$, the routine goes to a step S74. At step S74, controller 1, in turn, determines whether present turbine speed variation rate $N'_T$ is equal to or larger than a range of a positive predetermined allowance value $X_1$ (for example, 3 REV/$S^2$) of target turbine speed variation rate $N_T'(V)$ ($N_T'=N_T'(V)+X_1$). If the result of determination is Yes (positive), namely, present turbine speed variation rate $N_T'$ is equal to or larger than the range of predetermined allowance value $X_1$ of target turbine speed variation rate $N_T'(V)$, controller 1 can determine that the working hydraulic supplied to second clutch 17 is low and the engagement is too slow and the routine goes to a step S76. At step S76, controller 1 enlarges feedback control duty ratio $D_{U1}$ by predetermined correction value α ($D_{U1}=D_{U1}+\alpha$).

On the other hand, if the result of determination at step S74 is No (negative), namely, present turbine speed variation rate $N_T'$ is smaller than the range of predetermined allowance value $X_1$ at the positive side of target turbine speed variation rate $N_T'(V)$, the routine goes to the next step S78. At step S78, according to the results of both determinations at step S70 and S74, present turbine speed variation rate $N_T'$ is within the range of positive and negative side predetermined allowance values X1, controller 1 can determine that present turbine speed variation rate $N_T'$ is approximately equal to turbine speed variation rate $N_T'(V)$, and feedback control duty ratio $D_{U1}$ is not corrected ($D_{U1}=D_{U1}$).

After the execution of steps S72, S76, or S78 is carried out, the routine returns to step S62. At step S62, controller 1 sets again (resets) corrected feedback control duty ratio $D_{U1}$ to duty ratio $D_C$. This resetting of $D_{U1}$ is repeatedly carried out if the result of determination at step S68 indicates No, namely, if difference ($N_T-N_{TJ}$) between turbine revolution speed $N_T$ and synchronous (turbine) revolution speed $N_{TJ}$ at the third speed stage after the gear shift is larger than predetermined value $\Delta N_C$. According to this resetting of feedback control duty ratio $D_{U1}$, the feedback is carried out.

The feedback control is advanced and the result of determination at step S68 gives Yes (positive). At this time, controller 1 can determine that the gear shift becomes approached to the end. In this case, the routine goes to a step S80. It is noted that a time point at which difference ($N_T-N_{TJ}$) between turbine revolution speed $N_T$ and turbine revolution speed $N_{TJ}$ at the third speed stage after the gear shift is carried out is equal to or smaller than predetermined value $\Delta N_C$ is called FF time point, as shown in FIGS. 8A through 8D. At step S80, controller 1 sets coupling side (clutched side) duty ratio $D_C$ to duty ratio $D_E$ over predetermined time $t_H$. This duty ratio $D_E$ is a duty ratio higher than duty ratio $D_{U1}$ at a time point at which the feedback control is ended by predetermined value $\Delta D_E$. In this way, at a time immediately before the end of the gear shift, the duty ratio is changed from feedback control duty ratio $D_{U1}$ to duty ratio $D_{U2}$ which is higher than feedback control duty ratio $D_{U1}$ by predetermined value $\Delta D_E$. Thus, the shift shock developed when duty ratio $D_C$ is 100% at time point SF at which predetermined time $t_H$ has passed is reduced.

When predetermined time $t_H$ has passed and it becomes the gear shift end time point (SF time point), duty ratio $D_C$ gives 100% at a final step S84. Thus, second clutch 17 is completely engaged and the series 2-3 up-shift is ended. In this way, after the coupling (clutching or engagement) side control is executed, the routine returns to the routine on the up-shift control and step S17 is executed. That is to say, controller 1 determines whether turbine revolution speed $N_T$ has reached to synchronous revolution speed $N_{TJ}$ at the third speed stage so as to determine whether the up-shift is ended.

If the result of the determination at step S17 is No (negative), namely, in a case where the up-shift is not yet finished, the release side control and the coupling (engagement) side control are continued. On the other hand, if the result of the determination at step S17 is Yes (positive), controller 1 determines that the up-shift is ended and the routine goes to a step S18. Steps S18 through S22 are steps to carry out various learning, namely, the learning of looseness fit time $t_F$, hydraulic release time $t_R$, and duty ratio learning value $D_{AL}$. The correction values of looseness fit time $t_F$, hydraulic release time $t_R$, and duty ratio learning value $D_{AL}$ learned at the present control period are reflected on the up-shift control in the same shift mode to be next carried out. In addition, the explanations of the learning and correction on these looseness fit time $t_F$, hydraulic release time $t_R$, and duty ratio learning value $D_{AL}$ will be omitted. Then, after such each learning is ended, the series 2-3 up-shift is ended.

Figure 10B:
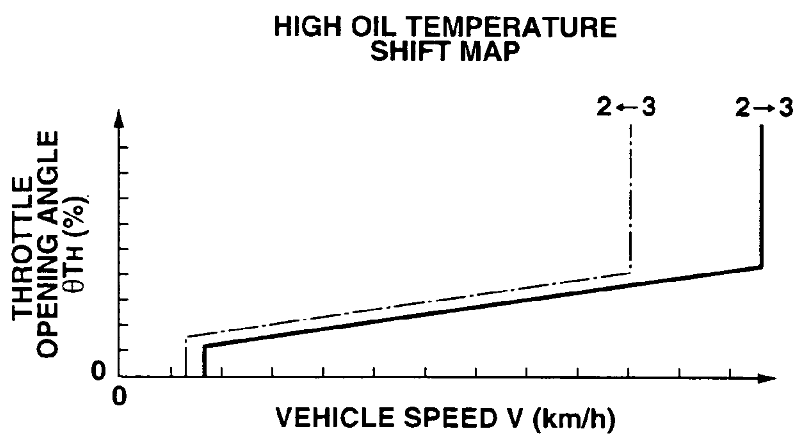

Next, an essential part of the control apparatus for the automatic transmission according to the present invention will be described below. Various shift maps other than ordinary shift map (refer to FIG. 10A) applied to the ordinary drive as described above are provided within shift map 3 stored in controller 1 of automatic transmission 7. On the basis of the information from the respective sensors, the shift maps are appropriately switched. Specifically, a high oil temperature shift map as shown in FIG. 10B is installed as a map having a different characteristic than that used during the ordinary gear shift. It is noted that the gear shift using the ordinary gear shifting shift map is herein called an ordinary gear shift and the gear shift using the high oil temperature shift map (refer to FIG. 10B) is called a high oil temperature gear shift.

Herein, the high oil temperature shift map will be explained below. The high oil temperature shift map is a map applied in place of ordinary gear shifting shift map when controller 1 determines that the temperature of ATF is a high oil temperature state equal to or higher than a predetermined value on the basis of the information from oil temperature sensor 14. As shown in FIG. 10B, in order to protect hydraulic circuit 11 of transmission 7, the gear shift is executed at the drive point different from the ordinary gear shift. It is noted that, in the high oil temperature map shown in FIG. 10B, only a 2-3 up-shift line from the second speed stage to the third speed stage and a 3-2 down-shift line from the third speed stage to the second speed stage are shown. However, in the same way as ordinary gear shifting shift map shown in FIG. 10A, up-shift lines and down-shift lines to the other speed stages are set.

Then, in a case where the gear shift is executed on the basis of the map other than the ordinary gear shifting shift map shown in FIG. 10A or in a case where the gear shift is executed in the manual mode (that is to say, the gear shift is executed at the drive point different from that during the ordinary gear shift), correction quantity calculating section 2 installed in controller 1 corrects initial duty ratio $D_{A1}$ (namely, an initial hydraulic) for the coupling (engagement or clutched) side frictional clutching element (second clutch 17 in the case of 2-3 up-shift).

Hereinafter, the correction of initial duty ratio $D_{A1}$ will specifically be described in the case where the 2-3 up-shift from the second speed stage to the third speed stage is carried out using the high oil temperature shift map shown in FIG. 10B. First, controller 1 determines whether the present time is during the ordinary gear shift when the gear shift command is issued. This determination is based on the information of whether the map applied to the gear shift is the ordinary gear shifting shift map and the information of whether it is the manual shift mode.

Then, when determining that it is not during the ordinary gear shift (herein, high oil temperature gear shift), correction quantity calculating section 2 derives turbine revolution speed $N_T$ on the basis of the information from input shaft revolution speed sensor 12. Next, ordinary gear shifting piston revolution speed calculating section 6 calculates turbine revolution speed (piston revolution speed) $N_{ST}$ in a case where the ordinary gear shifting shift map is applied under the same condition as the present gear shift state, namely, calculates turbine revolution speed $N_{ST}$ under the same gear shift kind during the ordinary gear shift (herein, the gear shift kind refers to the gear shift from the second speed stage to the third speed stage) and under the same throttle opening angle.

In this case, ordinary gear shifting piston revolution speed calculating section 6 can derive vehicle speed $V_{ST}$ at which the gear shift is executed during the same throttle opening angle using the ordinary gear shifting shift map and can multiply this vehicle speed $V_{ST}$ with a gear ratio before the gear shift is carried out to derive turbine revolution speed $N_{ST}$. Then, correction quantity calculating section 2 calculates correction quantity $D_{SC}$ on the basis of the following equation (6). It is noted that β denotes a constant in equation (6).

$$D_{SC}=\beta(N_T^2-N_{ST}^2) \quad (6).$$

In addition, initial hydraulic reference value calculating section 8 of controller 1 is provided with a map (not shown) prescribing a relationship between an engine output torque and a base value $D_{A0}$ of initial duty ratio (initial hydraulic reference value) is read from the map from the engine driving state during the execution of the gear shift. It is noted that, during the ordinary gear shift, base value $D_{A0}$ of initial duty ratio read from this map is directly set as initial duty ratio $D_{A1}$ by means of initial hydraulic setting section 9.

After base value $D_{A0}$ of initial duty ratio is read, initial hydraulic setting section 9 sets initial duty ratio $D_{A1}$ corrected in the following equation (7).

$$D_{A1}=D_{A0}+D_{SC} \quad (7).$$

Then, if initial duty ratio $D_{A1}$ is corrected in the way described above, second hydraulic setting section 5 outputs this initial duty ratio $D_{A1}$ so that the initial hydraulic corresponding to this initial duty ratio $D_{A1}$ is supplied to the coupling (engagement or clutched) side clutch (clutched frictional clutching element).

Since, in a case where the gear shift is executed at the vehicle speed higher than the ordinary drive, $N_T^2-N_{ST}^2>0$, the initial hydraulic (initial duty ratio $D_{A1}$) is corrected toward a high pressure side than that during the ordinary gear shift. During the gear shift at a higher vehicle speed than the ordinary gear shift, the slide resistance on each seal ring 48*a*, 48*b*, 48*c* (refer to FIG. 12) becomes large due to the large centrifugal hydraulic and the slide resistance of piston 40 becomes large. Since the initial hydraulic is corrected toward the high pressure side corresponding to the slide resistance, the operation of piston 40 becomes delayed so that such a situation that the blow up of the engine revolution occurs can positively be avoided.

In a case where the gear shift is executed at a lower vehicle speed than the ordinary drive, $N_T^2-N_{ST}^2<0$. Thus, the initial hydraulic (initial duty ratio $D_{A1}$) is corrected toward the lower pressure side than the ordinary gear shift. In addition, during the gear shift at the vehicle speed lower than the ordinary gear shift, the slide resistance of each seal ring 48*a*, 48*b*, and 48*c* (refer to FIG. 12) becomes small and the slide resistance of piston 40 becomes small. However, since the initial hydraulic is corrected toward the low pressure side corresponding to the slide resistance, such a situation that the operation timing of piston 40 is so early that an interlock or shift shock due to the interlock occurs can positively be avoided.

Figure 9:
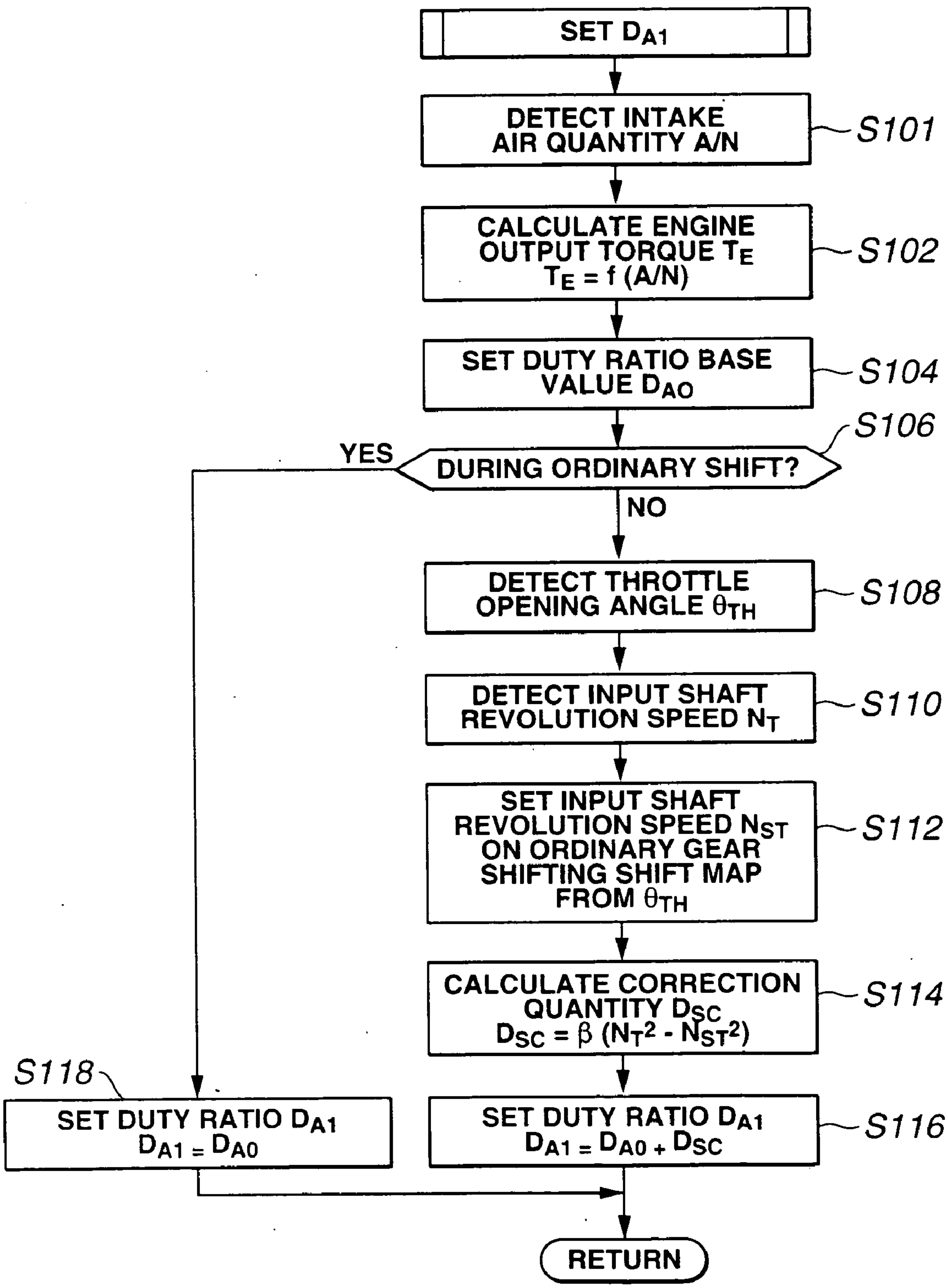
FIG. 9 is a flowchart representing a subroutine setting an initial hydraulic of the control apparatus for the automatic transmission.

Since the control apparatus for the automatic transmission according to the present invention is structured as described above, an action of the essential part of the present invention will be described below with reference to a flowchart shown in FIG. 9. First, at a step S101, controller 1 derives an intake air quantity per engine one stroke (A/N) on the basis of the intake air quantity information detected by airflow sensor 31. Next, at a step S102, controller 1 calculates engine output torque $T_E$ from A/N derived at step S101. It is noted that engine output torque $T_E$ is previously stored in controller 1 as a function with mainly A/N as a parameter.

Next, at a step S104, controller 1 derives base value $D_{A0}$ of the initial duty ratio on the basis of engine output torque $T_E$. It is noted that a map representing a relationship between engine output torque $T_E$ previously stored by the experiments is provided within controller 1 and base value $D_{A0}$ (initial hydraulic reference value) of the initial duty ratio is set from this map. Thereafter, at a step S106, controller 1 determines whether the present time is during the ordinary gear shift or during another gear shift to a predetermined target shift stage at a different drive point than the ordinary gear shift to the predetermined target shift stage. If the gear shift is in the ordinary gear shift (Yes) at step S106, the routine goes to a step S118. At step S118, the base value ($D_{A0}$) is set as initial duty ratio $D_{A1}=D_{A0}$. Then, the routine is returned to step S44.

On the other hand, if the present time is during the gear shift other than the ordinary gear shift (herein, high oil temperature gear shift) (No), the routine goes to a step S108. At step S108, controller 1 derives a throttle opening angle $\theta_{TH}$. At a step S110, controller 1 detects turbine revolution speed $N_T$ (piston revolution speed). In addition, at a step S112, controller 1 calculates turbine revolution speed $N_{ST}$ on a shift diagram at throttle opening angle $\theta_{TH}$ during the ordinary gear shift at a step S112. Then, at a step S114, controller 1 calculates correction quantity $D_{SC}$ from equation (6) and, at a step S116, controller 1 sets initial duty ratio $D_{A1}$ as $D_{A0}+D_{SC}$. ($D_{A1}=D_{A0}+D_{SC}$). Then, the routine is returned to step S44.

It is noted that steps S40 through S44 correspond to initial hydraulic setting section, steps S101 through S104 correspond to initial hydraulic reference value calculating section, step S114 corresponds to the correction quantity calculating section, step S40 corresponds to first hydraulic setting section, and steps S43 and S44 correspond to second hydraulic setting section. Hence, according to the control apparatus for the automatic transmission in the preferred embodiment, even if automatic transmission 7 carries out the gear shift at the vehicle speed which is different from the ordinary gear shift, the clutching (engagement) operation can be carried out at the appropriate timing. The shift shock and the blowing up of the engine revolution can assuredly be prevented.

Furthermore, even if the gear shift based on the shift map different from the ordinary gear shifting shift map and the gear shift based on the driver's shift operation in the manual shift mode, the initial hydraulic is corrected. Hence, the setting of the initial hydraulic itself corresponding to the gear shift different from the ordinary gear shift becomes unnecessary. Thus, a saving of the memory capacity and an easiness in a tuning of the initial hydraulic can be achieved. In addition, the interlock due to variations between transmission individual bodies and the blowing up of the engine revolution can be prevented. That is to say, during the hydraulic setting of high pressure (SS time point through IF time point and duty ratio $D_C$=100%), the operation of piston 40 is quick. However, since the degree of influence on each seal ring 48*a*, 48*b*, 48*c* is considered to be varied among the individual transmissions. If an initial hydraulic reference value at the time of setting the hydraulic at the high pressure is corrected, there is a possibility that the following inconveniences occur depending upon the transmission.

That is to say, if the correction of the initial hydraulic reference value is excessively large, the frictional clutching (engagement) elements have a torque capacity so that the interlock occurs and the shock occurs. If the correction of the initial hydraulic reference value is excessively small, the clutching (engagement) of the clutching (engagement) side frictional clutching (engagement) element is delayed with respect to the release of the release side frictional clutching (engagement) element so that the blowing up (or a racing) of the engine revolution occurs. On the contrary, in the preferred embodiment, since correction quantity calculating section 2 corrects the initial hydraulic reference value (base value $D_{A0}$ of initial duty ratio) when setting the hydraulic at the low pressure after setting the hydraulic at the high pressure, the interlock due to the variations in the transmission individual bodies (individual transmissions) and the blowing up (racing) of the engine revolution can be prevented. In addition, in a case where the gear shift to the predetermined shift stage at a higher vehicle speed than the ordinary gear shift is carried out, namely, since the initial hydraulic reference value in a case where the gear shift is carried out at a higher vehicle speed side and at the same throttle opening angle as the ordinary gear shift is corrected so as to be higher pressure than the ordinary gear shift, the initial hydraulic according to the variation in the slide resistance of piston 40 is supplied. Thus, such a situation that the pressing force for piston 40 is insufficient and a clutching (engagement) timing of second clutch 17 becomes delayed is avoided and the blowing up (racing) of the engine revolution can be prevented. In addition, in a case where the gear shift to the predetermined gear shift stage at a lower vehicle speed than the ordinary gear shift, namely, in a case where the gear shift occurs at the same throttle opening angle as during the ordinary gear shift and at a lower vehicle speed, the initial hydraulic is corrected to become low pressure than the ordinary gear shift, the initial hydraulic is corrected to be at a lower pressure than that of the ordinary gear shift. Hence, the initial hydraulic according to the variation in the slide resistance of piston 40 is supplied. Thus, such a situation that the pressing force for piston 40 is excessively large and the clutching (engagement) timing is too early can be avoided and the shift shock can be prevented. It is noted that the present invention is not limited to the preferred embodiment and various changes and modifications may be made without departing from the scope of the present invention. For example, in the embodiment, the frictional clutching (engagement) element (second clutch 17) clutched (engaged) during 2-3 up-shift is integrally revolved with an input shaft (turbine shaft 10). Hence, the input shaft revolution speed is used as the revolution speed of the piston. However, if the torque converter of automatic transmission is in a lock up state, the piston revolution speed may be derived from the engine speed. In addition, if the engaged frictional clutching (engagement) element is linked to a revolution member other than the input shift and is integrally revolved, the revolution speed of the revolution member may directly be detected or calculated on the basis of the revolution speed detected by another sensor to derive the revolution speed of piston 40.

In this embodiment, as one example of the gear shift other than the ordinary gear shift, the gear shift such that the gear shift occurs at a high vehicle speed than the ordinary gear shift (gear shift using the high temperature shift map) has been explained. However, the present invention may be applied to the gear shift such that the gear shift occurs at a vehicle speed lower than the ordinary gear shift. In addition, the present invention is applicable to the gear shift during the manual shift mode. In addition, in the embodiment, the present invention is applied to the case where the gear shift is carried out in the case of the execution of the pre-charge. However, the present invention is applicable to the automatic transmission such that the pre-charge is not executed.

In this embodiment, initial hydraulic reference value set to the low pressure hydraulic set for time $T_C$ from IF time point to BS time point shown in FIG. 8C is corrected. However, the correction may be made for the initial hydraulic reference value set for time $t_F+t_C$ from SS time point to BS time point shown in FIG. 8C. In addition, in the above-described embodiment, the engine output is derived from A/N obtained from airflow sensor 31. However, for example, the engine output torque may be derived using the throttle valve and engine speed. The engine output torque may be derived from another parameter correlated to the engine output torque.

In the embodiment, initial duty ratio $D_{A1}$ is maintained until deviation ($N_{TI}-N_T$) between turbine revolution speed $N_T$ and synchronous revolution speed $N_{TI}$ at the second speed stage (the shift stage before the gear shift is carried out) is equal to or larger than predetermined value $\Delta N_B$. However, the present invention is not limited to this. Initial duty ratio $D_{A1}$ may be increased in pressure at a predetermined gradient or may be maintained only for a predetermined period of time.

In the above-described embodiment, base value $D_{A0}$ of the initial duty ratio during the ordinary gear shift is set on the basis of the map representing the relationship between the previously stored engine output torque $T_E$ and base value $D_{A0}$ of the initial duty ratio in controller 1. However, the present invention is not limited to this. The base value may be calculated or set on the basis of the parameter such as automatic transmission input torque or throttle opening angle. Or, alternatively, the base value may be a value corrected by means of a learning.

In the above-described embodiment, the target shift stage is determined on the basis of the drive point determined according to the throttle opening angle and vehicle speed. However, the present invention is not limited to this. In place of throttle opening angle, for example, an accelerator opening angle may be used. In place of the vehicle speed, another parameter may be used. Ordinary gear shifting piston revolution speed calculating section 6 calculates the piston revolution speed at the same shift kind and the same throttle opening angle during the ordinary gear shift when automatic transmission 7 is shifted at the drive point different from the ordinary gear shift. However, the present invention is not limited to this. In place of the throttle opening angle, the accelerator opening angle may be used.

The entire contents of a Japanese Patent Application No. 2004-104075 (filed in Japan on Mar. 31, 2004) are herein incorporated by reference. The scope of the invention is defined with reference to the following claims.

What is claimed is:

1. A control apparatus for an automatic transmission, the automatic transmission comprising:

a plurality of frictional clutching elements having a hydraulically operated piston and a frictional clutching member clutched when pressed by means of the piston; and a shift map determining a target shift stage on the basis of a drive point determined according to at least a throttle opening angle and a vehicle speed or parameter values corresponding to the throttle opening angle and the vehicle speed and the automatic transmission achieving a plurality of shift stages by a combination of a clutching or release of the plurality of frictional clutching elements, the control apparatus comprising:

a piston revolution speed detecting section that detects a revolution speed of the piston of one of the frictional clutching elements clutched during a gear shift to a predetermined target shift stage;

an ordinary gear shifting piston revolution speed calculating section that calculates the piston revolution speed at the same shift kind and at the same throttle opening angle or at a parameter value corresponding to the throttle opening angle when the automatic transmission carries out the gear shift to the predetermined target gear shift at the drive point different from during an ordinary gear shift during which the gear shift based on the shift map is carried out;

an initial hydraulic setting section that sets an initial hydraulic by which the piston strokes in a direction in which the clutched frictional clutching element presses;

an initial hydraulic reference value calculating section that calculates an initial hydraulic reference value which provides a reference value of the initial hydraulic from the shift kind and the throttle opening angle or from the parameter value corresponding to the throttle opening angle; and a correction quantity calculating section that calculates a correction quantity for the reference value of the initial hydraulic on the basis of squares of the revolution speed of the piston calculated by the ordinary gear shifting piston revolution speed calculating section and of the revolution of the piston detected by the piston revolution speed detecting section, the initial hydraulic setting section setting the initial hydraulic reference value to the initial hydraulic during the ordinary gear shift and correcting the initial hydraulic reference value by the correction quantity to set the corrected initial hydraulic reference value to the initial hydraulic when the gear shift to the predetermined target gear shift stage is carried out at the drive point different from during the ordinary gear shift.

2. A control apparatus for an automatic transmission as claimed in claim 1, wherein the initial hydraulic setting section comprises a first hydraulic setting section that sets the initial hydraulic to a predetermined high pressure hydraulic for a predetermined time during a start of the gear shift to promote the stroke of the piston; and a second hydraulic setting section that sets the initial hydraulic to a hydraulic of lower pressure than the predetermined high pressure hydraulic after the predetermined time has passed and wherein the correction quantity calculating section calculates the correction quantity of the initial hydraulic reference value when the second hydraulic setting section sets the initial hydraulic to the hydraulic of lower pressure than the predetermined high pressure hydraulic.

3. A control apparatus for an automatic transmission as claimed in claim 1, wherein the initial hydraulic setting section corrects the initial hydraulic reference value toward a higher pressure side than during the ordinary gear shift by the correction quantity to provide the initial hydraulic in a case where the gear shift to the predetermined target shift stage is carried out when the revolution speed of the piston detected by the piston revolution speed detecting section is higher than the revolution speed of the piston calculated by the ordinary gear shifting piston revolution speed calculating section.

4. A control apparatus for an automatic transmission as claimed in claim 1, wherein the initial hydraulic setting section corrects the initial hydraulic reference value toward a lower pressure side than during the ordinary gear shift by the correction quantity to provide the initial hydraulic in a case where the gear shift to the predetermined target shift stage is carried out when the revolution speed of the piston detected by the piston revolution speed detecting section is lower than the revolution speed of the piston calculated by the ordinary gear shifting piston revolution speed calculating section.

5. A control apparatus for an automatic transmission as claimed in claim 1, wherein the initial hydraulic setting section sets the initial hydraulic whose pressure is higher than the initial hydraulic during the ordinary gear shift in a case where the gear shift to the predetermined target shift stage is carried out at a vehicle speed higher than that during the ordinary gear shift.

6. A control apparatus for an automatic transmission as claimed in claim 1, wherein the initial hydraulic setting section sets the initial hydraulic whose pressure is lower than the initial hydraulic during the ordinary gear shift in a case where the gear shift to the predetermined target shift stage is carried out at a vehicle speed lower than that during the ordinary gear shift.

7. A control apparatus for an automatic transmission as claimed in claim 1, wherein the control apparatus further comprises an input shaft revolution speed sensor to detect an input shaft revolution speed ($N_T$) and wherein the ordinary gear shift piston revolution calculating section calculates a turbine revolution speed ($N_{ST}$) at the same shift kind and at the same throttle opening angle or at the parameter value corresponding to the throttle opening angle during the ordinary gear shift and the correction quantity calculating section calculates the correction quantity ($D_{SC}$) on the basis of the following equation: $D_{SC}=\beta(N_T^2-N_{ST}^2)$, wherein β denotes a constant.

8. A control apparatus for an automatic transmission as claimed in claim 5, wherein the hydraulic to drive the piston is supplied from a solenoid, the solenoid undergoing a duty ratio control, and, as a duty ratio of the duty ratio control becomes higher, the hydraulic to drive the piston becomes higher and wherein the initial hydraulic setting section reads a base value ($D_{A0}$) of an initial duty ratio corresponding to the initial hydraulic reference value from a driving state of an engine associated with the automatic transmission and sets the corrected initial duty ratio ($D_{A1}$) to the initial duty ratio ($D_{A1}$) when the gear shift to the predetermined target gear shift stage is carried out at the drive point different from during the ordinary gear shift, the corrected initial duty ratio ($D_{A1}$) being expressed as $D_{A1}=D_{A0}+D_{SC}$.

9. A control apparatus for an automatic transmission as claimed in claim 6, wherein the initial duty ratio ($D_{A1}$) is corrected toward a higher pressure hydraulic side than during the ordinary gear shift when $(N_T^2-N_{ST}^2)>0$.

10. A control apparatus for an automatic transmission as claimed in claim 6, wherein the initial duty ratio ($D_{A1}$) is corrected toward a lower pressure hydraulic side than during the ordinary gear shift when $(N_T^2-N_{ST}^2)<0$.

11. A control apparatus for an automatic transmission as claimed in claim 10, wherein the control apparatus further comprises an ordinary shift determining section that determines whether the present time is during the ordinary gear shift or during another gear shift to the predetermined target shift stage at the different drive point than the ordinary gear shift to the predetermined target shift stage and an initial duty ratio setting section that sets the initial duty ratio ($D_{A1}$) to the base value ($D_{A0}$) ($D_{A1}=D_{A0}$) when the ordinary shift determining section determines that the present time is during the ordinary gear shift.

12. A control apparatus for an automatic transmission as claimed in claim 11, wherein the initial duty setting section correctively adds the base value ($D_{A0}$) to the correction quantity ($D_{SC}$) to set the corrected initial duty ratio to the initial duty ratio ($D_{A1}$) ($D_{A1}=D_{A0}+D_{SC}$) when the ordinary shift determining section determines that the present time is during the other gear shift than the ordinary gear shift.

13. A control method for an automatic transmission, the automatic transmission comprising: a plurality of frictional clutching elements having a hydraulically operated piston and a frictional clutching member clutched when pressed by means of the piston; and a shift map determining a target shift stage on the basis of a drive point determined according to at least a throttle opening angle and a vehicle speed or parameter values corresponding to the throttle opening angle and the vehicle speed and the automatic transmission achieving a plurality of shift stages by a combination of a clutching or release of the plurality of frictional clutching elements, the control method comprising:

detecting a revolution speed of the piston of one of the frictional clutching elements clutched during a gear shift to a predetermined target shift stage;

calculating the piston revolution speed at the same shift kind and at the same throttle opening angle or at a parameter value corresponding to the throttle opening angle when the automatic transmission carries out the gear shift to the predetermined target gear shift at the drive point different from during an ordinary gear shift during which the gear shift based on the shift map is carried out;

setting an initial hydraulic by which the piston strokes in a direction in which the clutched frictional clutching element presses;

calculating an initial hydraulic reference value which provides a reference value of the initial hydraulic from the shift kind and the throttle opening angle or from the parameter value corresponding to the throttle opening angle; and calculating a correction quantity for the reference value of the initial hydraulic on the basis of squares of the revolution speed of the piston calculated and of the revolution speed of the piston detected, the initial hydraulic reference value being set to the initial hydraulic during the ordinary gear shift and the initial hydraulic reference value being corrected by the correction quantity to set the corrected initial hydraulic reference value to the initial hydraulic when the gear shift to the predetermined target gear shift stage is carried out at the drive point different from during the ordinary gear shift.

14. A control apparatus for an automatic transmission, the automatic transmission comprising:

a plurality of frictional clutching elements having a hydraulically operated piston and a frictional clutching member clutched when pressed by means of the piston; and a shift map determining a target shift stage on the basis of a drive point determined according to at least a throttle opening angle and a vehicle speed or parameter values corresponding to the throttle opening angle and the vehicle speed and the automatic transmission achieving a plurality of shift stages by a combination of a clutching or release of the plurality of frictional clutching elements, the control apparatus comprising:

piston revolution speed detecting means for detecting a revolution speed of the piston of one of the frictional clutching elements clutched during a gear shift to a predetermined target shift stage;

ordinary gear shifting piston revolution speed calculating means for calculating the piston revolution speed at the same shift kind and at the same throttle opening angle or at a parameter value corresponding to the throttle opening angle when the automatic transmission carries out the gear shift to the predetermined target gear shift at the drive point different from during an ordinary gear shift during which the gear shift based on the shift map is carried out;

initial hydraulic setting means for setting an initial hydraulic by which the piston strokes in a direction in which the clutched frictional clutching element presses;

initial hydraulic reference value calculating means for calculating an initial hydraulic reference value which provides a reference value of the initial hydraulic from the shift kind and the throttle opening angle or from the parameter value corresponding to the throttle opening angle; and correction quantity calculating means for calculating a correction quantity for the reference value of the initial hydraulic on the basis of squares of the revolution speed of the piston calculated by the ordinary gear shifting piston revolution speed calculating means and of the revolution of the piston detected by the piston revolution speed detecting means, the initial hydraulic setting means setting the initial hydraulic reference value to the initial hydraulic during the ordinary gear shift and correcting the initial hydraulic reference value by the correction quantity to set the corrected initial hydraulic reference value to the initial hydraulic when the gear shift to the predetermined target gear shift stage is carried out at the drive point different from during the ordinary gear shift.

* * * * *